(12) United States Patent
Shen et al.

(10) Patent No.: US 7,743,445 B2
(45) Date of Patent: Jun. 29, 2010

(54) AUXILIARY SUPPORTING UNIT, BOARDING BRIDGE WITH THE SAME AND METHOD FOR IMPROVING STABILITY OF THE BOARDING BRIDGE BY USING THE SAME

(75) Inventors: Hongsheng Shen, Guangdong (CN); Zuhua Zheng, Guangdong (CN); Zhaohong Zhang, Guangdong (CN); Li Tan, Guangdong (CN)

(73) Assignee: China International Marine Containers (Group), Co., Ltd., Shenzhen, Guangdong (CN)

( * ) Notice: Subject to any disclaimer, the term of this patent is extended or adjusted under 35 U.S.C. 154(b) by 888 days.

(21) Appl. No.: 10/590,684

(22) PCT Filed: Jan. 25, 2005

(86) PCT No.: PCT/CN2005/000107

§ 371 (c)(1), (2), (4) Date: Aug. 25, 2006

(87) PCT Pub. No.: WO2005/082713

PCT Pub. Date: Sep. 9, 2005

(65) Prior Publication Data

US 2007/0136961 A1   Jun. 21, 2007

(30) Foreign Application Priority Data

Feb. 26, 2004   (CN) .................... 2004 1 0004652

(51) Int. Cl.
*E01D 1/00* (2006.01)

(52) U.S. Cl. .......................... 14/71.5; 14/71.3
(58) Field of Classification Search ................ 14/71.3, 14/71.5; 404/85
See application file for complete search history.

(56) References Cited

U.S. PATENT DOCUMENTS

| | | | | |
|---|---|---|---|---|
| 3,340,782 A | * | 9/1967 | Novak | 404/85 |
| 3,577,838 A | | 5/1971 | Dordrecht | |
| 3,834,562 A | * | 9/1974 | Norrie | 414/344 |
| 4,318,197 A | | 3/1982 | Drozd | |
| 5,040,257 A | * | 8/1991 | Bentz | 14/70 |
| 6,055,692 A | | 5/2000 | Pell et al. | |
| 6,330,726 B1 | * | 12/2001 | Hone et al. | 14/71.5 |
| 6,954,959 B2 | * | 10/2005 | Hutton | 14/71.5 |
| 7,428,765 B2 | * | 9/2008 | Hutton | 14/71.5 |

FOREIGN PATENT DOCUMENTS

| | | | |
|---|---|---|---|
| JP | 2002-37196 | * | 2/2002 |
| WO | WO 02/34622 A1 | | 5/2002 |

* cited by examiner

*Primary Examiner*—Gary S Hartmann
(74) *Attorney, Agent, or Firm*—Greer, Burns & Crain, Ltd.

(57) ABSTRACT

The present invention relates to an auxiliary supporting unit for a boarding bridge, a boarding bridge with the same and method for improving stability of boarding bridge. The auxiliary supporting unit includes a leg support which can be driven to extend and retract; and a foot portion attached to one end of the leg support, wherein the foot portion can be supported on the ground when the leg support being extended and can leave the ground when the leg support being retracted.

19 Claims, 6 Drawing Sheets

AUXILIARY SUPPORTING UNIT, BOARDING BRIDGE WITH THE SAME AND METHOD FOR IMPROVING STABILITY OF THE BOARDING BRIDGE BY USING THE SAME

FIELD OF THE INVENTION

The present invention relates to an auxiliary supporting unit used for a passenger boarding bridge, it also relates to a boarding bridge with the same and method for improving the boarding bridge, particularly to an adjustable auxiliary supporting unit, a boarding bridge with improved stability and reliability as well as a method for improving stabilty the boarding bridge.

BACKGROUND OF THE INVENTION

Figure 1:
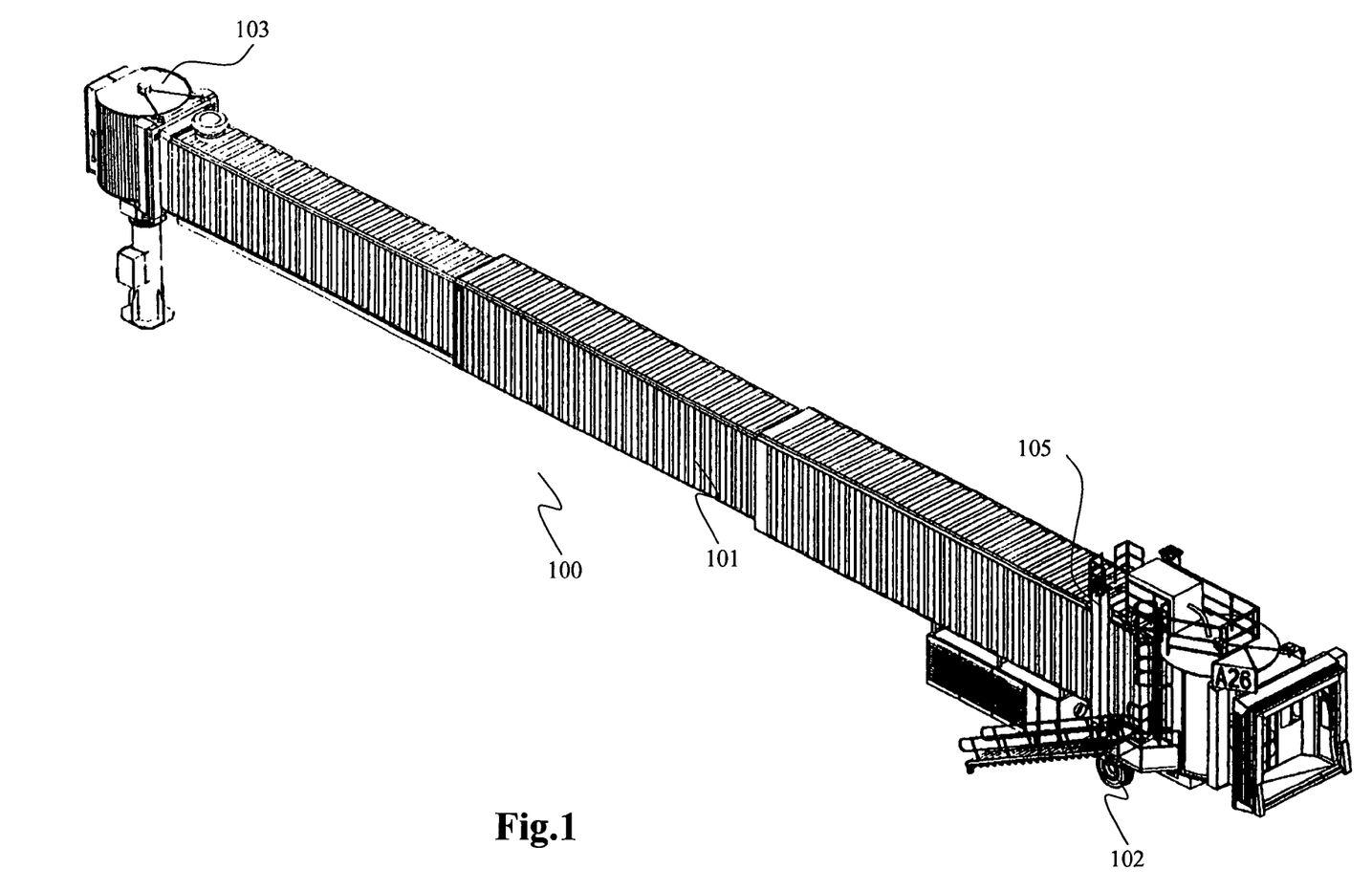
FIG. 1 is a perspective view of a conventional boarding bridge, showing that a wheel mechanism supports an elevation system in a manner of single-point supporting.
Figure 2:
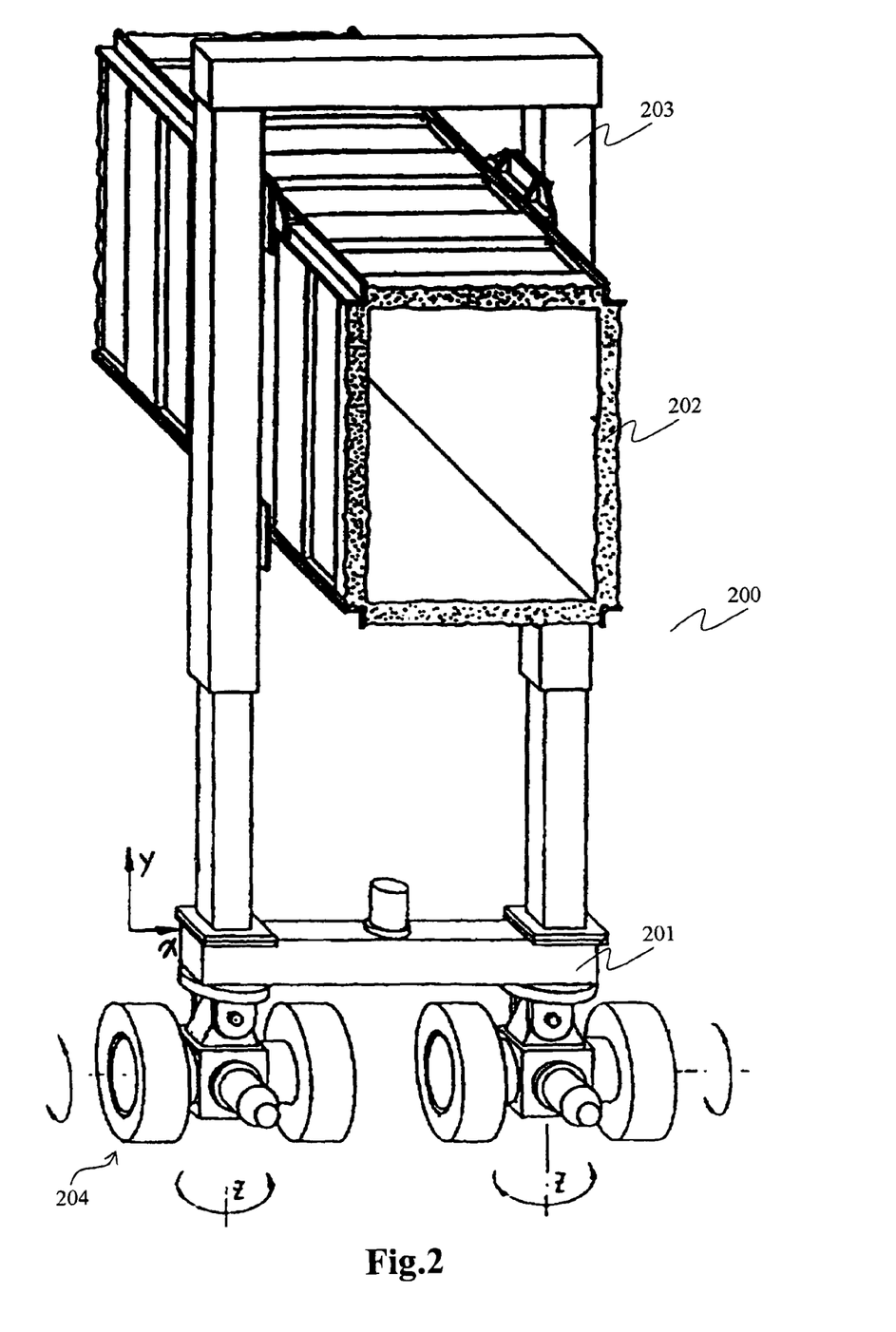
FIG. 2 is a perspective view of another conventional boarding bridge, showing that a wheel mechanism supports an elevation system in a manner of double-point supporting.
Figure 3:
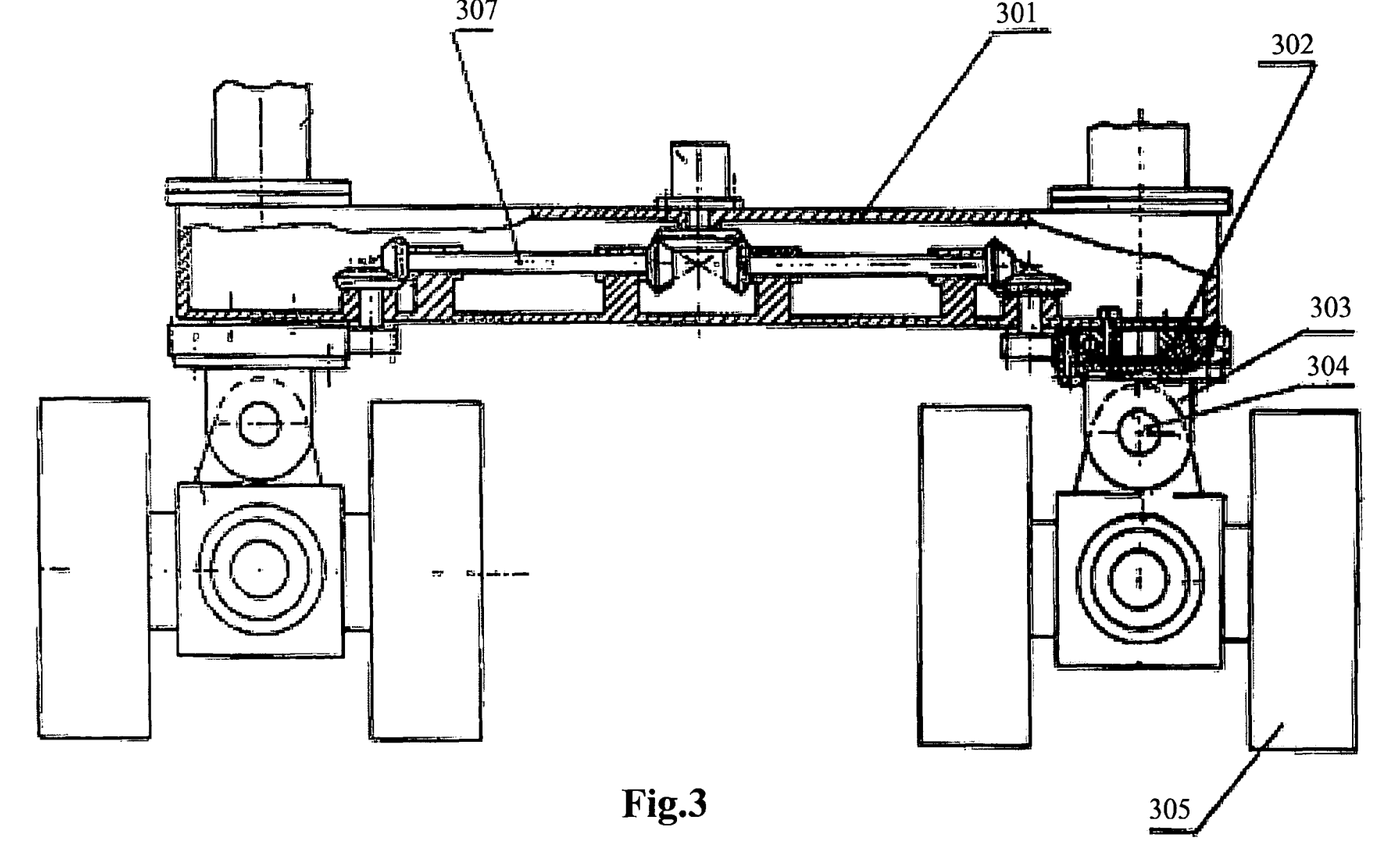
FIG. 3 is an enlarged cross-sectional view of the wheel mechanism 201 of FIG. 2.

The passenger boarding bridge is used in airports and is very popular due to its convenience and security. The boarding bridge assists a passenger when the passenger is boarding an airplane directly from a terminal building. At present, many kinds of passenger boarding bridges are disclosed, such as in Chinese patent No. ZL95226673.3, ZL00258374.7 and American U.S. Pat. No. 5,855,035. Conventionally, there are two manners for supporting a beam of a boarding bridge, which is respectively named a single-point supporting and a double-point supporting. With reference to FIG. 1, a passenger boarding bridge 100 in so-called single-point supporting manner is disclosed in Chinese Patent ZL00258374.7, which comprises a rotunda connected to a terminal (not shown), a tunnel 101 which can be retracted or extended to change its length, elevation system used for adjusting the height of the tunnel 101, and a wheel mechanism 102 for supporting the tunnel 101 through the elevation system etc. The wheel mechanism 102 is provided with two wheels attached respectively to both ends of a beam. A bearing plate is substantially located in the center of the beam and used for supporting the elevation system. However, the bridge 100 has poor stability, as the tunnel 101 often wobbles when it carries passengers or when the wheel mechanism 102 is driven to move or turn around the bearing plate. Chinese patent ZL95226673.3, as shown in FIG. 2, discloses another bridge 200 with a wheel mechanism 201 for supporting an elevation system 203 which can adjust or control a tunnel 202 to change its height. Now referring to FIG. 2 and FIG. 3, specially, two sets of wheel assembly 204 are attached to both ends of a beam 301 to improve the stability of the bridge 200, each set of which further comprises a revolving base 302 used for supporting, a hinge support 303 and a hinge shaft 304, and two wheels 305. Importantly, for this kind of bridge 200 in so-called double-supporting manner, a synchronous steering mechanism 307 is necessary in order to drive the wheel assembly 204 at two ends of the beam 301 to move and rotate, or a control system is alternatively utilized to drive the wheel 305 in order to accomplish synchronous moving and/or rotation of the wheel 305. In fact, the conventional boarding bridge 200 according to the double-supporting manner is more stable than before, while it has a complex structure and a low safety, and the control system for synchronous operation of the wheels are even more complicated and expensive. Furthermore, the reliability of the bridge is deduced accordingly as it is unavoidable for the control system to break down.

SUMMARY OF THE INVENTION

One object of the present invention is to provide an auxiliary supporting unit for a boarding bridge. The auxiliary supporting unit is mounted under two ends of a beam of a wheel mechanism in order to provide auxiliary support to the boarding bridge, thereby the stability of the boarding bridge is increased.

Another object of the present invention is to provide a boarding bridge with an auxiliary supporting unit and a method for improving the stability of the boarding bridge.

The above object of the present invention is realized by providing an auxiliary supporting unit, comprising a leg support which can be driven to extend and retract; and a foot portion attached to one end of the leg support, wherein the foot portion can be supported on the ground when the leg support is extended and can leave the ground when the leg support is retracted.

In the above-mentioned auxiliary supporting unit, the foot portion is a universal wheel.

In the above-mentioned auxiliary supporting unit, a buffer is further provided between the leg support and the foot portion.

In the above-mentioned auxiliary supporting unit, a manual mechanism is provided for driving the foot portion.

In the above-mentioned auxiliary supporting unit, a power-driven thruster having a fixed part and a moving part is provided for driving the foot portion.

In the above-mentioned auxiliary supporting unit, the foot portion is configured into a supporting seat.

In the above-mentioned auxiliary supporting unit, the foot portion is a universal wheel.

In the above-mentioned auxiliary supporting unit, the moving part of the leg support is connected to the supporting seat via a hinge.

In the above-mentioned auxiliary supporting unit, the power-driven thruster is a hydraulic cylinder or an electrical thruster.

Another object of the present invention is realized by providing a boarding bridge comprising a tunnel for carrying the passenger; an elevation system for changing the height of the tunnel; a wheel mechanism for driving the tunnel to extend or extract, provided with a beam for supporting the elevation system; and wheels, attached to the beam through a bearing assembly; and an auxiliary supporting unit provided with a leg support attached under ends of the beam and defined outside the wheels, wherein the leg support can be driven to extend and retract; and a foot portion attached to one end of the leg support. The foot portion can be supported on the ground when the leg support being extended and can leave the ground when the leg support being retracted.

In the above-mentioned boarding bridge, the foot portion is a universal wheel, the first end of the leg support is mounted under the beam and the second end of the leg support is connected to the universal wheel.

In the above-mentioned boarding bridge, a buffer is further provided between the leg support and the foot portion.

In the above-mentioned boarding bridge, the leg support is a power-driven thruster, which has a fixed part mounted under the beam and a moving part connected to the foot portion.

In the above-mentioned boarding bridge, the foot portion is configured into a supporting seat.

In the above-mentioned boarding bridge, the foot portion is a universal wheel.

In the above-mentioned boarding bridge, the moving part of the power-driven thruster is connected to the supporting seat via a hinge.

In the above-mentioned boarding bridge, the power-driven thruster is a hydraulic cylinder or an electrical thruster.

In the above-mentioned boarding bridge, an angle detector is in coaxial connection with the bearing assembly for measuring an angle of wheel mechanism turned relative to a longitudinal axis.

In the above-mentioned boarding bridge, the foot portion is driven to extend to be supported on the ground with a pressure by adjusting the leg support of the auxiliary supporting unit.

Another object of the present invention is realized by providing a method for improving the stability of a boarding bridge, wherein the boarding bridge is provided with a tunnel for carrying the passengers; an elevation system for changing the height of the tunnel; a wheel mechanism for driving the tunnel to extend or retract, provided with a beam for supporting the elevation system; and wheels, attached to the beam through a bearing assembly, wherein the method comprises providing a leg support which can be driven to extend and retract, attached under both ends of the beam and defined outside of the wheels; and providing a foot portion attached to one end of the leg support, wherein the foot portion can be supported on the ground when the leg support is extended and can leave the ground when the leg support is retracted; providing an angle detector coupled to the bearing assembly for obtaining signals in relation with the direction and an angle at which the wheel mechanism is turned; extending the leg support to drive the foot portion to be supported on the ground when the detected angle is larger than a first predetermined value; retracting the leg support when the detected angle is smaller than a second predetermined value.

In the above-mentioned method, the first predetermined value is larger than the second predetermined value.

In the above-mentioned method, further comprising the step of defining the leg support into an inactive status when the bridge moves into the area where an angle the wheel mechanism turned is larger than the second predetermined angle but smaller than the first predetermined angle in order to avoid the leg support from being extended or being retracted frequently.

In the above-mentioned method, the foot portion is configured into a universal wheel.

In the above-mentioned method, further comprising the steps of providing a buffer between the foot portion and the leg support; and
extending the leg support until the foot portion is supported on the ground with a predetermined pressure so as to balance torsion force of the boarding bridge when the boarding bridge is moving.

In the above-mentioned method, the foot portion is configured into a supporting seat in hinge joint with the leg support.

In the above-mentioned method, further comprising the step of providing a power-driven mechanism in order to drive the leg support to extend or retract.

In the above-mentioned method, further comprising the step of providing a manual mechanism to drive the leg support to extend or retract.

In the above-mentioned method, an angle detector is provided on the beam to measure an angle of the wheels relative to a longitudinal axis of the boarding bridge and send the detected angle signal to the control system of the boarding bridge, whereby the leg support is driven to extend or retract by the power-driven thruster in a given pressure under the controlling of the control system in response to the detected angle signal.

In the above-mentioned method, when the detected angle is lager than a first predetermined value $\alpha$, the foot portion is driven by the power-driven thruster under the controlling of the control system of the boarding bridge to extend out to be supported on the ground in a given pressure so as to increase the stability of the boarding bridge; when the detected angel is smaller than a second predetermined value $\beta$, the foot portion is driven by the power-driven thruster to retract to its original status; and when the detected angle is larger than the second predetermined value $\beta$ and smaller than the first predetermined value $\alpha$, the power-driven thruster is idle under the control of the control system of the boarding bridge.

In the-above-mentioned method, the first predetermined value $\alpha$ is larger than the second predetermined value $\beta$.

BRIEF DESCRIPTION OF THE DRAWINGS

The present invention will now be described in details with accompanying drawings and preferred embodiments, which however, won't be used as a limitation to the invention.

DETAILED DESCRIPTION OF THE PREFERRED EMBODIMENT

A wheel mechanism is one of major components of a passenger boarding bridge and has been improved by the inventors and will be discussed in this specification.

Figure 4:
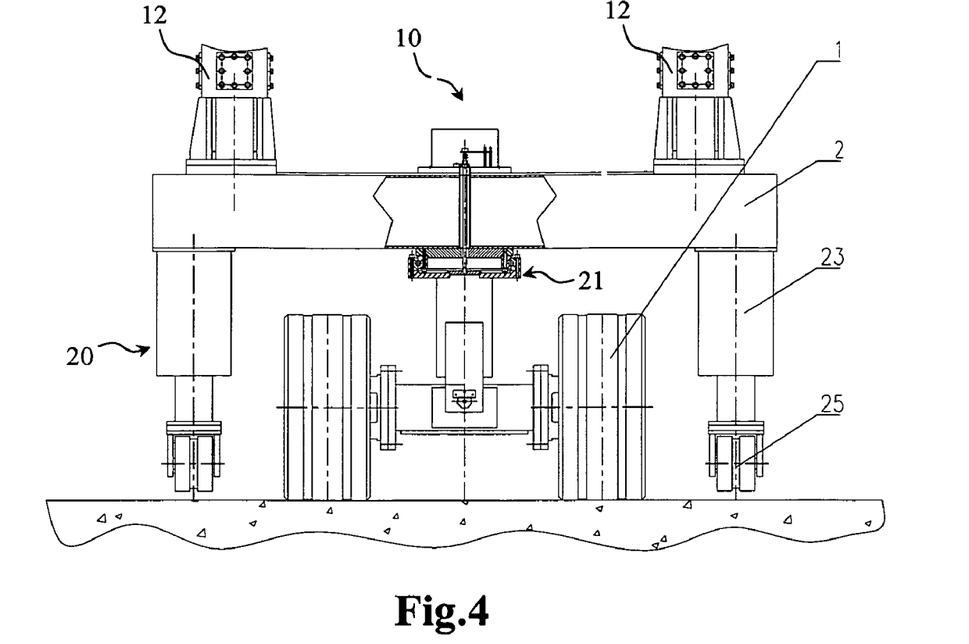
FIG. 4 is a schematic view of the wheel mechanism with an auxiliary supporting unit according to a first embodiment of the present invention.

Referring to FIG. 4, a wheel mechanism 10 according to the first embodiment of the present invention used for passenger boarding bridge (not shown) comprises a beam 2, on which an elevation system for adjusting a tunnel of the bridge (not shown) is provided; a wheel assembly 1 coupled with a bearing assembly to further support the beam 2, being driven by a control system and allowing the bridge 10 to be driven up to the airplane, and auxiliary supporting units 20 which are further attached to both ends of the beam 2 in order to provide auxiliary support to the beam 2 and the tunnel through the elevation system.

The auxiliary supporting unit 20 of the present invention includes a leg support mounted to the beam and foot portion attached thereon. The leg support can be adjusted to retract or extend under a predetermined condition.

The extension or retraction of the leg support of the auxiliary supporting unit according to the invention may be realized by providing a power-driven mechanism thereon, such as a hydraulic cylinder or an electrical thruster, or by providing a manual mechanism which is for example similar to the structure of a mechanical lifting jack comprising a screw bolt and a screw nut. That is, one end of the lifting jack is connected to the beam and the other is connected to the foot portion, whereas the extension length of the leg support is adjustable in a screw driven manner. In addition, a manual pump, or a mechanism such as a rod with two flanges at opposite ends thereof can be used for the invention, whereby the length of the leg support can be adjusted by adding adjusting washers or wedge blocks.

Now the structure of the auxiliary supporting unit will be described in detail hereinafter with reference to embodiments of the present invention.

Embodiment 1

FIG. 4 is a schematic view of a first preferred embodiment of the auxiliary supporting unit in accordance with the present invention. The wheel mechanism 1 is provided on a center of the beam 2 through the bearing assembly 21. A pair of the auxiliary supporting units 20 are defined outside the wheel mechanism 1 and respectively mounted under both ends of the beam 2 in order to support the beam 2. Each unit 20 comprises a leg support 23 attached under the beam 2 and a foot portion 25. The leg support 23 can be driven by the control system to retract and extend, whereas the foot portion 25 may leave the ground under a predetermined condition while retracting the leg support 23 and may be alternately supported on the ground while extending the leg support 23. As the foot portion 25 may be stepped on the ground, the foot portion 25 according to the preferred embodiment of the invention shall be configured into universal wheels.

Preferably, the auxiliary supporting unit 20 is configured to keep a gap between the ground and the universal wheel (foot portion) 25. The universal wheel (foot portion) 25 will depend on the ground and support the boarding bridge through the beam and prevent the boarding bridge from wobbling or slanting when a slight tilting occurs during the moving of the boarding bridge or carrying the passengers.

Embodiment 2

Figure 5:
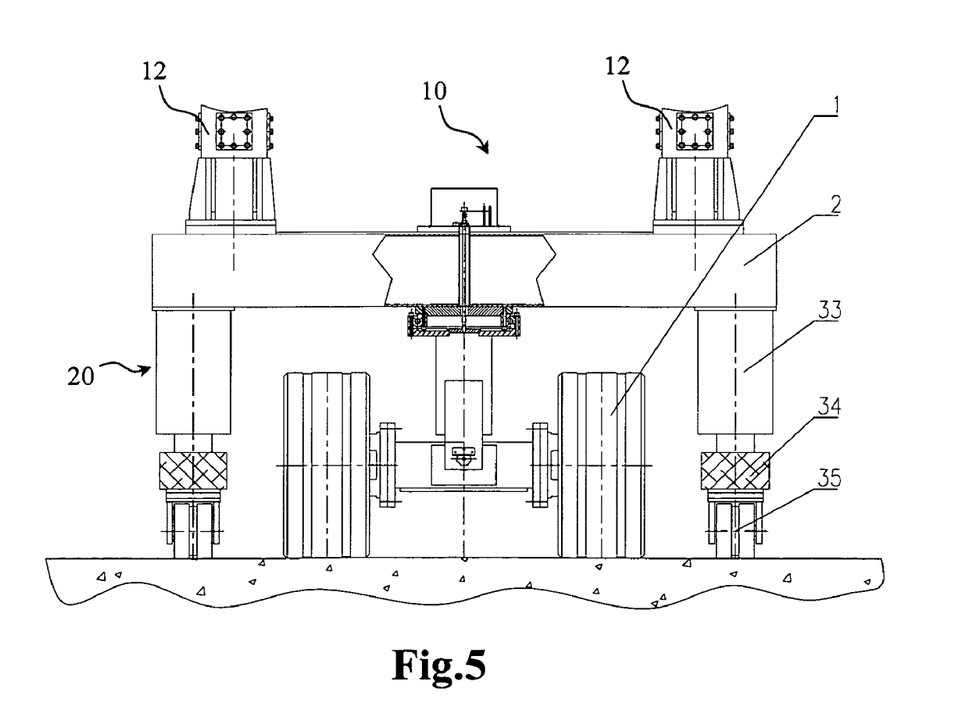
FIG. 5 is a schematic view of the wheel mechanism with an auxiliary supporting unit according to a second embodiment of the present invention.

Now referring to FIG. 5, a second preferred embodiment of the auxiliary supporting units 20 are also provided outside the wheel mechanism 1, each of which is mounted under one end of the beam 2 in order to support the beam 2. The unit 20 comprises a leg support 33 attached under the beam 2 and a foot portion 35. The leg support 33 can be driven by the control system to retract and extend, whereas the foot portion 35 is also configured into a universal wheel in order to step on the ground. Preferably, the foot portion 35 of the preferred embodiment is attached to the leg support 33 through a buffer 34.

However, the surface of ground of an airport is always uneven, the buffer 34 is advantageously utilized to ensure the universal wheel 35 is supported on the ground at a pre-pressure in order to balance torsion forces due to the slope of the boarding bridge and improve the stability of the boarding bridge. In this case, the pre-pressure at one side of the beam 2 will be a constant value once the boarding bridge is located, but will be changed within a predetermined range when the boarding bridge is moving.

Embodiment 3

Figure 6:
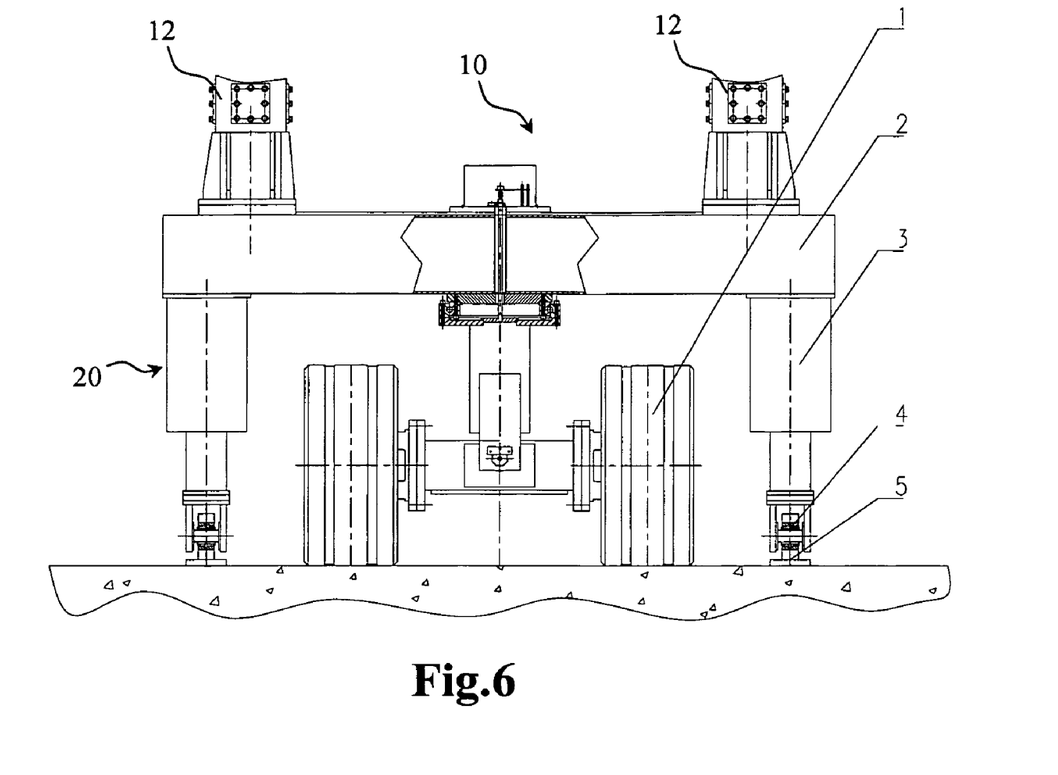
FIG. 6 is a schematic view of the wheel mechanism with an auxiliary supporting unit according to a third embodiment of the present invention.
Figure 7:
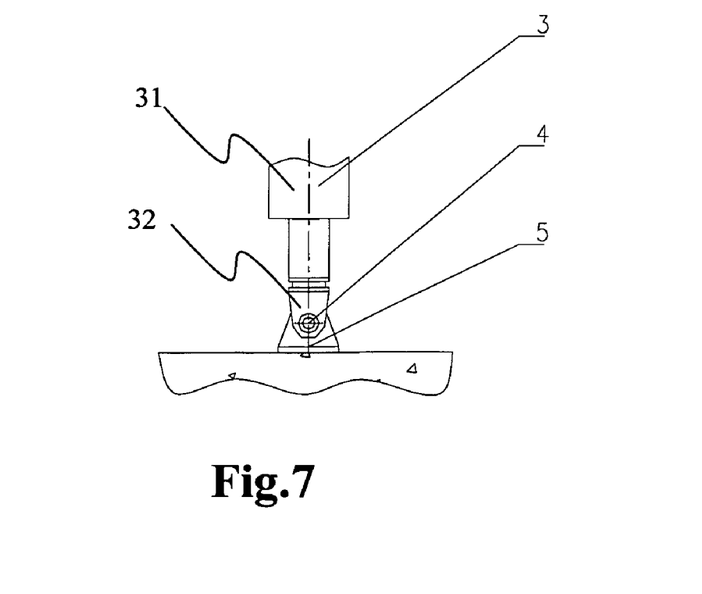
FIG. 7 is a side view of the auxiliary supporting unit as shown in FIG. 6.

FIGS. 6-7 shows a third embodiment of a pair of auxiliary supporting units 20 which are also provided outside the wheel mechanism 1. Each unit 20 is mounted under one end of the beam 2 in order to support the beam 2, comprising a leg support 3 attached under the beam 2 and can be driven by the control system to retract and extend, and a foot portion 5 supported on the ground. In this embodiment, the leg support 3 is a power-driven thruster, which has a fixed part 31 mounted under the beam 2 and a moving part 32 connected to the foot portion 5. The foot portion 5 is configured into a supporting seat coupled to the leg support 3 in manner of hinge joint. For example, a hinge 4 may be provided for connecting the supporting seat to the leg support 3. Alternately, the supporting seat 5 may be coupled to the leg support 3 directly.

When the boarding bridge is located on a certain position, the supporting seat 5 is driven by the control system of the boarding bridge to be supported on the ground with a pressure. The pressure makes the boarding bridge more stable by balancing the torsion forces presented when carrying passengers. When the boarding bridge starts to move again, the supporting seat 5 will be retracted to its original status.

Embodiment 4

Figure 8:
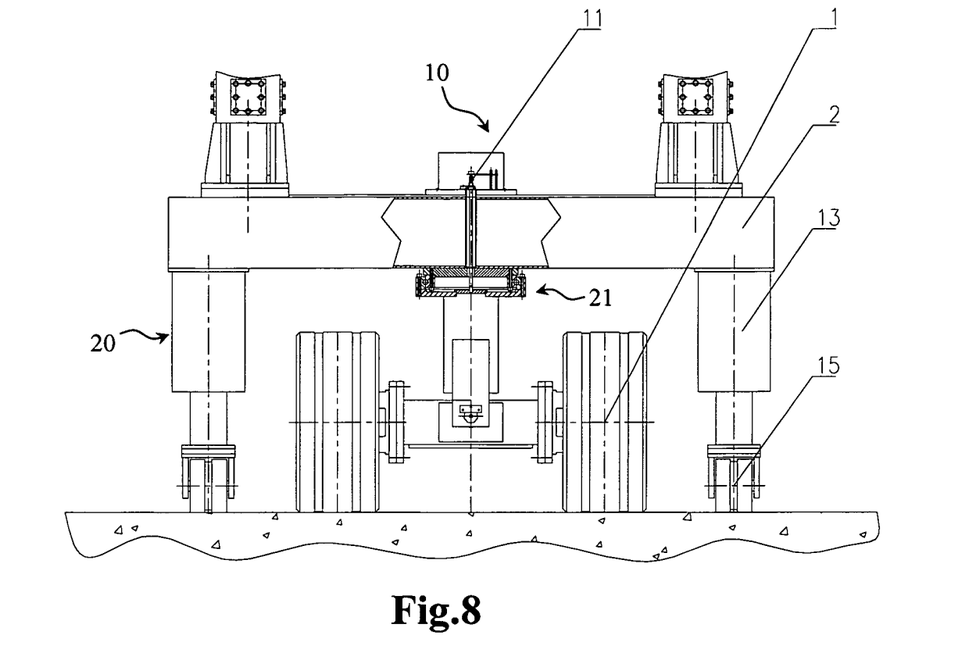
FIG. 8 is a schematic view of the wheel mechanism with an auxiliary supporting unit according to a fourth embodiment of the present invention.
Figure 9:
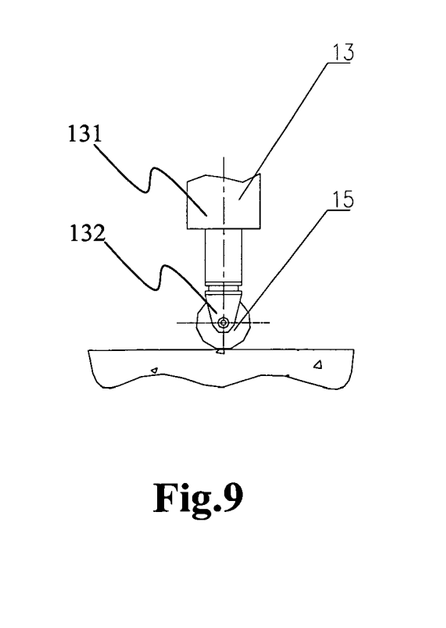
FIG. 9 is a side view of the auxiliary supporting unit as shown in FIG. 8.
Figure 10:
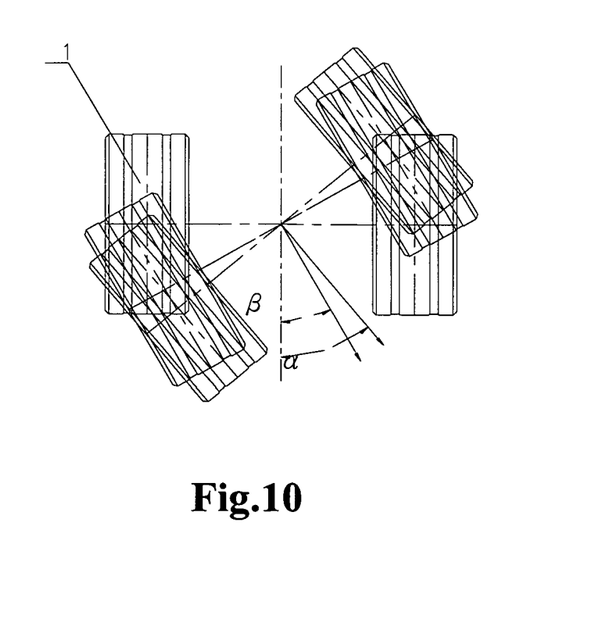
FIG. 10 is a schematic view of the wheel mechanism showing angles that the wheel mechanism is driven to rotate.

FIGS. 8-10 show a fourth embodiment of an auxiliary support unit 20. The structure of the auxiliary support unit 20 according to the preferred embodiment is substantially the same as that of the first embodiment except for an angle detector 11 which will be described in detail hereinafter.

For Example, each unit 20 is mounted under one end of the beam 2 in order to support the beam 2, comprising a leg support 13 attached under the beam 2 and can be driven by the control system to retract and extend, and a foot portion 15 supported on the ground. In this embodiment, the leg support 13 is a power-driven thruster, which has a fixed part 131 mounted under the beam 2 and a moving part 132 connected to the foot portion 15. The foot portion 15 is configured into a universal wheel coupled to the leg support 13.

The angle detector 11 is preferably in coaxial connection with the bearing assembly 21 provided on the beam 2 in order to measure the angle for the wheel mechanism 1 rotating relative to the longitudinal axis of the boarding bridge. For example, the angle detector 11 may be a potentiometer etc. The angle signals detected by the detector 11 are sent to the control system of the boarding bridge.

Especially, a method of controlling the auxiliary support unit of the present invention will be explained further on.

Firstly, the control system may receive signals transferred from detector 11 in relation with a direction and angle as long as the wheel mechanism 1 of the boarding bridge starts to move.

Then, the control system can judge according to the detected angle signals whether the boarding bridge is in stable condition and then can drive the leg support to be extended or retracted if not.

When the detected angle θ is larger than a first predetermined value α, the auxiliary support unit of the present invention can be driven by the control system to extend until the foot portion is supported on the ground with a pressure so as to balance the torsion forces of the boarding bridge, thereby the stability of the boarding bridge is increased. When the detected angel θ is smaller than a second predetermined angle β, the auxiliary support unit of present invention is driven to retract until the foot portion leaves the ground to reduce friction between the ground and the foot portion and also to reduce the consumption of foot portion so as to increase its life span. When the detected angle is larger than the angle β and smaller than the angle α, the leg support of the invention is under an inactive status. The angle α should be configured to be larger than the angle β according to the invention in order to avoid the leg support from being extended or being retracted frequently when the bridge movers into the area where an angle the wheel mechanism turned is larger than angle β but smaller than angle α.

It is to be understood, however, that even though numerous characteristics and advantages of the present invention have been set forth in the foregoing description, together with details of the structure and function of the invention, the disclosure is illustrative only. Changes may be made in details, especially in matters of shape, size, and arrangement of parts within the principles of the invention to the full extent indicated by the broad general meaning of the terms in which the appended claims are expressed.

INDUSTRIAL APPLICABILITY

According to the present invention, the auxiliary supporting unit has a simple structure and is easy to be manufactured, installed and adjusted. Advantageously, the auxiliary supporting unit of the present invention can also be easily installed on the conventional single-point boarding bridge, so as to reduce the slant and wobbling of the boarding bridge and enhance the stability of the boarding bridge.

According to the control method of the present invention, the power-driven thruster can be easily controlled to keep the stability of the boarding bridge.

What is claimed is:

1. A boarding bridge, comprising:
   a tunnel for carrying passengers;
   an elevation system for changing the height of the tunnel;
   a wheel mechanism for supporting the tunnel and driving the tunnel to extend or retract, provided with
   a beam for supporting the elevation system; and
   wheels, attached to the beam through a bearing assembly and being in contact with the ground; and
   an auxiliary supporting unit for providing an auxiliary support to the tunnel when the boarding bridge is moving or when the boarding bridge is located at a position, said auxiliary supporting unit being located outside of the wheels and provided with
   two leg supports respectively attached under two ends of the beam and located outside of the wheels, wherein each leg support can be driven to extend and retract; and
   two foot portions respectively attached to one end of the leg supports, wherein the foot portions can be supported on the ground when the leg supports are extended and can leave the ground when the leg supports are retracted.

2. The boarding bridge as claimed in claim 1, wherein at least one of the two foot portions is a universal wheel, the first end of the respective leg support is mounted under the beam and the second end of the leg support is connected to the universal wheel.

3. The boarding bridge as claimed in claim 2, wherein a buffer is further provided between the leg supports and the foot portions.

4. The boarding bridge as claimed in claim 1, wherein each of said leg supports is a power-driven thruster, which has a fixed part mounted under the beam and a moving part connected to the foot portion.

5. The boarding bridge as claimed in claim 4, wherein each of said foot portions is configured into a supporting seat.

6. The boarding bridge as claimed in claim 4, wherein the each of said foot portions is a universal wheel.

7. The boarding bridge as claimed in claim 5, wherein the moving part of each of said power-driven thrusters is connected to the supporting seat via a hinge.

8. The boarding bridge as claimed in claim 4, wherein each of said power-driven thrusters is one of a hydraulic cylinder and an electrical thruster.

9. The boarding bridge as claimed in claim 6, wherein an angle detector is in coaxial connection with the bearing assembly for measuring an angle of the wheel mechanism turned relative to a longitudinal axis.

10. The boarding bridge as claimed in claim 3, wherein each of said foot portions is driven to extend to be supported on the ground with a pressure by adjusting the leg support of the auxiliary supporting unit.

11. A method for improving stability of a boarding bridge, wherein the boarding bridge is provided with
   a tunnel for carrying passengers;
   an elevation system for changing the height of the tunnel;
   a wheel mechanism for supporting the tunnel and driving the tunnel to extend or retract, provided with
   a beam for supporting the elevation system; and
   wheels, attached to the beam through a bearing assembly and being in contact with the ground, wherein the method comprises:
   providing two leg supports which can be driven to extend and retract, said two leg supports being attached under two ends of the beam and located outside of the wheels; and
   providing two foot portions, each of which is attached to one end of the respective leg supports, wherein each of the foot portions can be supported on the ground when the respective leg support is extended and can leave the ground when the leg support is retracted;
   detecting a direction and an angle at which the wheel mechanism is slanted when the boarding bridge is moving or when the boarding bridge is located at a position,
   extending one of the two leg supports at a lower end of the beam to drive the corresponding foot portion to be supported on the ground when a detected dimension of the angle is larger than a first predetermined value;
   retracting the one of the two leg supports when the detected dimension of the angle is smaller than a second predetermined value.

12. The method as claimed in claim 11, wherein the first predetermined value is larger than the second predetermined value.

13. The method as claimed in claim 12, further comprising the step of defining each of the leg supports as being in an inactive status when the bridge moves into the area where an angle to which the wheel mechanism is slanted is larger than the second predetermined angle but smaller than the first predetermined angle in order to avoid the leg supports from being extended or being retracted frequently.

14. The method as claimed in claim 11, wherein each of the foot portions is configured into a universal wheel.

15. The method as claimed in claim 12, further comprising the steps of:
   providing a buffer between the foot portions and the leg supports; and
   extending the leg supports until the foot portions are supported on the ground with a pressure to balance torsion force of the boarding bridge when the boarding bridge is moving.

16. The method as claimed in claim 11, wherein the foot portions are each configured into a supporting seat in a hinge joint with the respective leg support.

17. The method as claimed in claim 11, further comprising the step of providing a power-driven mechanism to drive each of the leg supports to extend or retract.

18. The method as claimed in claim 11, further comprising the step of providing a manual mechanism to drive each of the leg supports to extend or retract.

19. The method as claimed in claim 11, further comprising the step of providing an angle detector coupled to the bearing assembly for obtaining signals in relation with the direction and the angle at which the wheel mechanism is slanted.

* * * * *